US006245240B1

(12) United States Patent
Noble

(10) Patent No.: US 6,245,240 B1
(45) Date of Patent: Jun. 12, 2001

(54) TREATMENT OF A SOLUTION CONTAINING IRON SALTS

(75) Inventor: Brian Cameron Noble, Ingleby Barwick (GB)

(73) Assignee: Tioxide Group Services Limited, London (GB)

( * ) Notice: Subject to any disclaimer, the term of this patent is extended or adjusted under 35 U.S.C. 154(b) by 0 days.

(21) Appl. No.: 09/367,675

(22) PCT Filed: Feb. 18, 1998

(86) PCT No.: PCT/GB98/00504

§ 371 Date: Nov. 15, 1999

§ 102(e) Date: Nov. 15, 1999

(87) PCT Pub. No.: WO98/37022

PCT Pub. Date: Aug. 27, 1998

(30) Foreign Application Priority Data

Feb. 21, 1997 (GB) .................................. 9703662

(51) Int. Cl.$^7$ ................ C02F 1/52; C02F 1/72; C01G 45/02; C01G 49/00
(52) U.S. Cl. ............ 210/711; 210/713; 210/714; 210/722; 210/758; 423/50; 423/52; 423/140; 423/146
(58) Field of Search .................. 210/710, 711, 210/713, 714, 722, 912, 758; 423/50, 52, DIG. 1, 140, 146

(56) References Cited

U.S. PATENT DOCUMENTS

| | | | |
|---|---|---|---|
| 779,058 | * | 1/1905 | Vaughen . |
| 2,311,314 | * | 2/1943 | Reichert et al. . |
| 2,500,039 | * | 3/1950 | Magoffin et al. . |
| 2,786,751 | * | 3/1957 | Roy et al. . |
| 3,337,452 | * | 8/1967 | Teske et al. . |
| 3,349,031 | * | 10/1967 | Hatch et al. . |
| 4,067,789 | * | 1/1978 | Harris et al. . |
| 4,290,866 | * | 9/1981 | Bolton et al. . |
| 4,377,508 | * | 3/1983 | Rothberg . |
| 5,180,563 | * | 1/1993 | Lai et al. . |
| 5,240,600 | * | 8/1993 | Wang et al. . |

FOREIGN PATENT DOCUMENTS

| | | | |
|---|---|---|---|
| 1592558 | * | 11/1970 | (DE) . |
| WO 97/34386 | * | 11/1970 | (WO) . |

* cited by examiner

Primary Examiner—Duane Smith
Assistant Examiner—Fred Prince
(74) Attorney, Agent, or Firm—Russell R. Stolle; Ron D. Brown; Christopher J. Whewell

(57) ABSTRACT

Provided herein is a process for treatment of solutions which contain ferrous, ferric and soluble manganese species which process comprises addition of an oxidizing agent to such a solution to cause formation of manganese dioxide particles and adding manganese dioxide seed particles so as to cause nascent manganese dioxide agglomerates formed from the action of the addition of the oxidizing agent on the soluble manganese species to adhere to the manganese dioxide seed particles. By a process according to the invention, it is possible to effectively remove the soluble manganese species as solid manganese dioxide by having effective control over the size of the manganese dioxide particles to enable their subsequent removal using ordinary filtration techniques.

10 Claims, No Drawings

TREATMENT OF A SOLUTION CONTAINING IRON SALTS

This invention relates to treatment of a mixture of iron and manganese salts so as to reduce the manganese content thereof and in particular to the treatment of iron salts produced in the production of titanium dioxide by the sulphate process.

In the sulphate process for the production of titanium dioxide, titaniferous raw material such as ilmenite is digested with sulphuric acid to form a solid mass which is treated with water and filtered to provide a solution containing mainly titanium sulphate, ferrous sulphate and ferric sulphate. The ferric ions are reduced to ferrous ions by the addition of iron, and the solution is cooled under vacuum to crystallise out the ferrous sulphate (commonly known as copperas) leaving a solution of titanium sulphate from which titanium dioxide may be precipitated by hydrolysis. Alternatively, the titanium dioxide may be precipitated first and the copperas crystallised out from the waste solution.

Clearly, the quantity of copperas relative to the quantity of titanium dioxide produced depends on the ratio of iron to titanium in the raw material. Typical figures are circa 1:1 for ilmenite (massive), 0.71:1 for ilmenite (sand) and 0.15:1 for ilmenite (slag). In any case, it will be appreciated that copperas is produced in substantial amounts for which a use must be found as there are environmental problems involved in its disposal.

One use of copperas is as the base material from which a coagulant for treatment of water may be prepared. In one conventional method, the ferrous sulphate is oxidised to ferric sulphate by being dissolved in a mixture of sulphuric acid and nitric acid. On addition to water containing colloidal particles, the ferric sulphate hydrolyses to form an insoluble hydroxide which interacts with the colloidal particles causing them to coagulate. The coagulated particles can then be removed by settlement and/or filtration.

A further use of the by-product is for the production of iron oxide. However, the soluble manganese is not oxidised by the conventional methods. Although it is known that soluble manganese can be oxidised to insoluble manganese dioxide by the addition of a further oxidising agent such as peroxide or potassium permanganate, the manganese dioxide so produced is in very finely divided colloidal form which is difficult and expensive to remove, particularly on a commercial scale and hence the final ferric sulphate product still has sufficient manganese content to make it unacceptable for the above uses.

According to one aspect of the invention, there is provided a method of treating a solution containing iron salt(s) contaminated with soluble manganese salt(s) comprising adding to the solution an oxidising agent capable of converting said manganese salt(s) to manganese dioxide, characterised by the addition of manganese dioxide as seeding agent, whereby any colloidal manganese dioxide is deposited on said seed particles, and by the separation of the manganese dioxide particles from the solution containing iron salt(s).

According to a preferred feature, the seeding agent is added before the additional oxidising agent. The seed particles desirably have an average particle size of at least 10 $\mu$m, but the preferred size is 30–50 $\mu$m.

In accordance with a further preferred feature, the seed particles are produced by reacting ferrous sulphate and potassium permanganate.

In order to reduce costs, the manganese dioxide particles separated from one batch of treated ferric sulphate solution can be recycled and used as the seed particles for a further batch of solution.

Treatment of copperas by the conventional method does not necessarily convert all the ferrous sulphate to ferric sulphate. Normally, this is disadvantageous. However, in accordance with a further preferred aspect of the invention, this residual ferrous sulphate can, by the addition of potassium permanganate, be used to produce the manganese dioxide seed particles. Of course, if too little ferrous sulphate is present to produce the required amount of seed particles, further ferrous sulphate may be added.

The oxidised agent may be any of the well known agents such as ozone, a peroxide, or a persulphate. Preferably, however, the oxidising agent is potassium permanganate which is added continuously over a period in the form of a saturated solution.

The method is effective when carried out at reflux temperature. However, it may be carried out at a temperature of 70 to 80° C., i.e. the temperature at which the copperas is dissolved in the sulphuric/nitric acids, so that the liquor can be taken straight from the reactor without any additional heating requirement.

The invention will be more readily understood from the following examples.

EXAMPLE 1

A manganese dioxide seeding agent was prepared by adding, over a period of 90 mins, a stoichiometric quantity (30 gpl) of potassium permanganate to 6 L of analar ferrous sulphate (20 gpl Fe) under reflux. The solution was held at reflux for a further 60 mins and the resulting solid filtered out and washed with water. Measurement using a Malvern Mastersizer gave an average particle size of 43 $\mu$m.

EXAMPLE 2

Copperas obtained as a by-product in the preparation of titanium dioxide by the sulphate process was dissolved in a mixture of sulphuric and nitric acids to give a ferric sulphate liquor having a pH of 0.5. The iron and manganese content was measured. The liquor was then refluxed and 50 gpl of the seed of Example 1 added. A peristaltic pump was used to continuously add a stoichiometric amount of potassium permanganate over a period of 90 minutes and the mixture was held at reflux for a further 30 minutes. A 25 ml sample was taken every 30 minutes and filtered through a 0.45 $\mu$m filter under vacuum. The resulting filtrate was analysed for iron and manganese content. The filtered solid was washed with water and the particle size measured. The results are shown in Table 1

TABLE 1

| Time (mins) | Mn content ($\mu$g/g) | Fe content (%) | Filter time (secs) | Particle size ($\mu$m) |
| --- | --- | --- | --- | --- |
| 0 | 1174 | 13.62 | 51 | 44.7 |
| 30 | 964 | 12.7 | 50 | 45.7 |
| 60 | 610 | 13 | 400 | 46.2 |
| 90 | 121 | 12.5 | 180 | 47.55 |
| 180 | <10 | 12.6 | 140 | 47 |

EXAMPLE 3

Example 2 was repeated except that the seed particles were added in an amount of 75 gpl.

The results are shown in Table 2.

TABLE 2

| Time (mins) | Mn content (µg/g) | Fe content (%) | Filter time (secs) | Particle size (µm) |
|---|---|---|---|---|
| 0 | 1230 | 133.3 | 53 | 41.59 |
| 30 | 890 | 12.7 | 28 | 41.91 |
| 60 | 570 | 13 | 45 | 43.25 |
| 90 | 120 | 12.5 | 40 | 43.17 |
| 180 | 50 | 12.6 | 33 | 42.74 |

EXAMPLE 4

1 liter of the solution from Example 3 was placed in a measuring cylinder and left to settle. After 7 days a clear supernatant liquor was present which contained 21 µg/g of manganese.

EXAMPLE 5

Example 3 was repeated except that an appropriate amount of the solids removed from the final solution was used as the seeding agent. Similar results were obtained.

EXAMPLE 6

The ferrous content of the solution resulting from the treatment of copperas with sulphuric and nitric acids was measured and, if necessary, further ferrous sulphate was added until there was sufficient to provide 75 gpl of manganese dioxide seeding agent when a stoichiometric amount of potassium permanganate was added.

A further amount of potassium permanganate was then added as in Example 2. The final solution was allowed to settle. A clear supernatant liquor formed in less than 24 hours and contained 500 µg/g manganese.

What is claimed is:

1. A method of treating a solution containing iron salts contaminated with soluble manganese salts comprising
    adding to the solution an oxidizing agent capable of converting said manganese salts to manganese dioxide,
    adding manganese dioxide as a seeding agent to form seed particles for said manganese salt, whereby any colloidal manganese dioxide is deposited on said seed particles, and
    separating the manganese dioxide particles from the solution.

2. A method according to claim 1, characterised in that the seeding agent is added before the addition of the oxidising agent.

3. A method according to claim 1, characterised in that the seed particles have an average particle size of at least 10 µm.

4. A method according to claim 3 in which the seed particles have an average particle size of 30–50 µm.

5. A method according to claim 1, characterised in that the seed particles are produced by reacting ferrous sulphate and potassium permanganate.

6. A method according to claim 1, characterised in that the manganese dioxide particles separated from the solution are recycled to form the seed particles.

7. A method according to claim 1 characterised in that potassium permanganate and, optionally ferrous sulphate, are added to the solution to cause production of the seed particles.

8. A method according to claim 1, characterised in that the oxidising agent is potassium permanganate.

9. A method according to claim 8, characterised in that the potassium permanganate is added continuously in the form of a saturated solution.

10. A method according to claim 1 characterised in that the temperature of the solution is 70–80° C.

* * * * *